Figure 1:
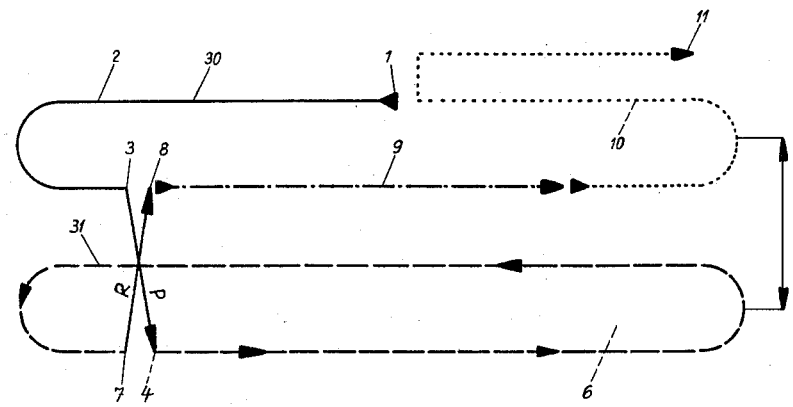

April 4, 1961     E. KYSELÁK ET AL     2,978,094
DEVICE FOR THE TRANSPORT OF SHOES
Filed Oct. 3, 1957     5 Sheets-Sheet 1

INVENTORS
Eduard Kyselák
Zdeněk Kocourek
BY Richard Low
Ag't

April 4, 1961 E. KYSELÁK ET AL 2,978,094
DEVICE FOR THE TRANSPORT OF SHOES
Filed Oct. 3, 1957 5 Sheets-Sheet 4

INVENTORS
Eduard Kyselák
Zdeněk Kocourek
BY

April 4, 1961 E. KYSELÁK ET AL 2,978,094
DEVICE FOR THE TRANSPORT OF SHOES
Filed Oct. 3, 1957 5 Sheets-Sheet 5

INVENTORS
Eduard Kyselák
Zdeněk Kocurek
BY Richard Ernst
Agt

United States Patent Office 2,978,094
Patented Apr. 4, 1961

2,978,094
DEVICE FOR THE TRANSPORT OF SHOES

Eduard Kyselák and Zdeněk Kocourek, Gottwaldov, Czechoslovakia, assignors to SVIT, narodni podnik, Gottwaldov, Czechoslovakia Filed Oct. 3, 1957, Ser. No. 687,983

5 Claims. (Cl. 198—84)

The present invention relates to a device for the transport of shoes undergoing treatment on endless finishing lines arranged independently above each other.

Hitherto, such endless conveyors for continuous shoe manufacture have been used, where the upper conveyor transports the shoes to be finished during the carrying out of the individual finishing operations, and the lower conveyor merely transports the shoes through a drying plant. Carriages are provided for supporting the shoes on both conveyors.

A drawback of the above described existing practice resides in the fact that the shoes have to be brought down by hand from the upper conveyor to the lower conveyor for the drying of the shoes and, after drying of the shoes under treatment, the same have to be brought, again by hand, upwards onto the upper conveyor for carrying out the finishing operations on the shoe.

The principal disadvantage of the above described existing transport arrangements consisted in that merely one type of shoes could be manufactured thereon, especially in those cases where the transport device had to be used for two working shifts following each other, one of the working shifts carrying out the initial working operations up to the operation requiring the shoe to be dried out and transferring the shoes to the conveyor for carrying the shoes through the drying plant, and the other shift first removing the shoes from the conveyor associated with the drying plant and returning the dried shoes to the upper conveyor for the further finishing operations on the shoe. Thus, the second shift worked on the shoes which the first shift had conveyed into the drying plant.

A further drawback of this arrangement is the insufficient control of production defaults which might have arisen in the course of either of the working shifts.

The drawbacks above mentioned are now eliminated by the arrangement embodying the present invention which permits each of both working shifts to perform its working operations on shoes remaining on a single conveyor, even as to finishing the unfinished shoes left over from the previous day after drying out.

The main feature of the arrangement embodying the present invention is the provision of two independent transport bands or conveyors arranged above each other, with each conveyor moving through independent working sectors where the shoe upper is stretched on the last, the shaft is connected with the sole and the shoe is subjected to the necessary finishing operations. Each conveyor has multipair carriages which are turnable about their vertical axes, said carriage unlocking automatically in the course of their continuous movement along the first working sector where the shoe uppers are stretched on the lasts, and then being turned so that the shoes on each conveyor then move through a joint drying space associated with both conveyors at the inside of the closed paths of the latter.

The chief advantage of the device according to the present invention consists in the complete absence of interdependence between the two endless conveyors, together with the possibility of absolutely independent operation of the two conveyors, thus securing the independence of the groups of workers operating on shoes on both conveyors, as well as in the possibility of finishing two different shoe types thereon.

A further advantage consists in that the relaying of the shoes under treatment from one band to another and vice versa is dispensed with by the use of a carriage for twice the usual number of pairs of shoes, thus making it possible to spare the skilled worker who was hitherto required to transfer the shoes between the two conveyors.

Figure 2:
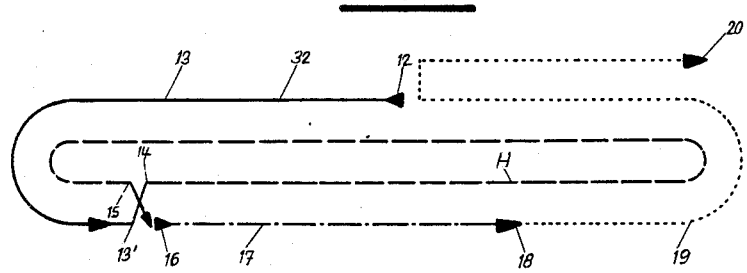
Figure 3:
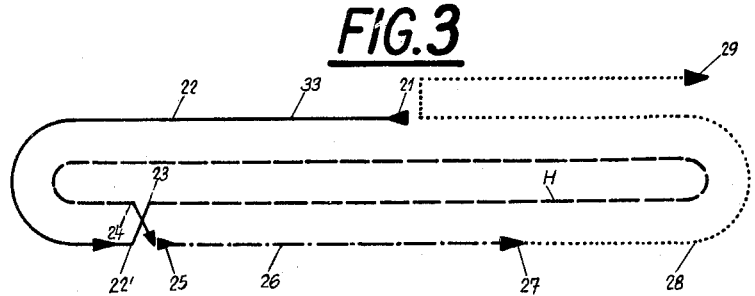
Figure 4:
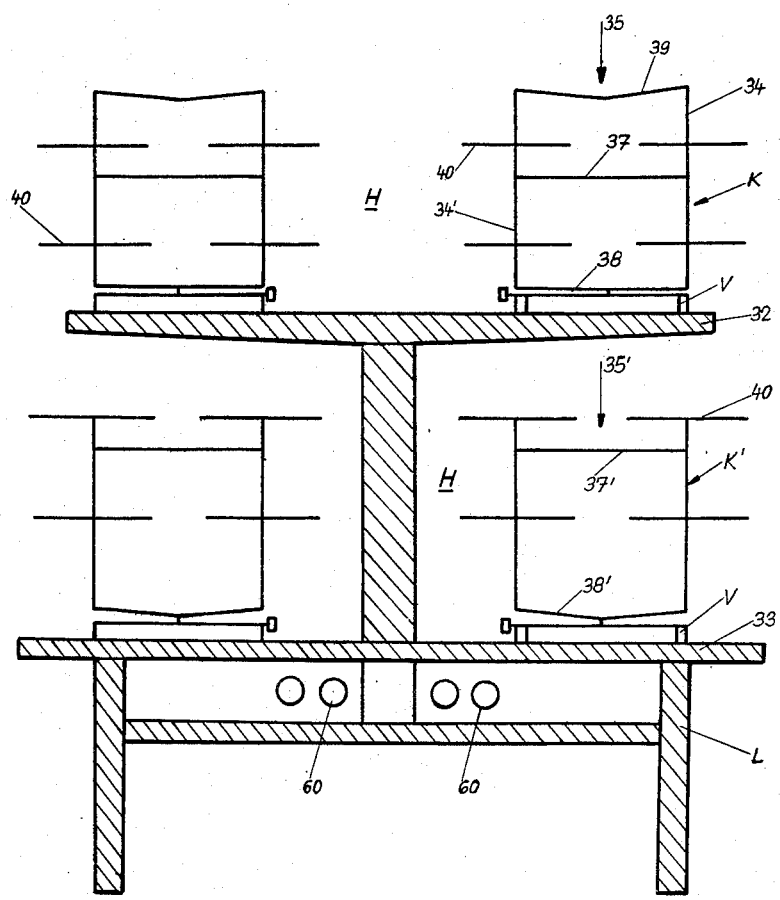
Figure 5:
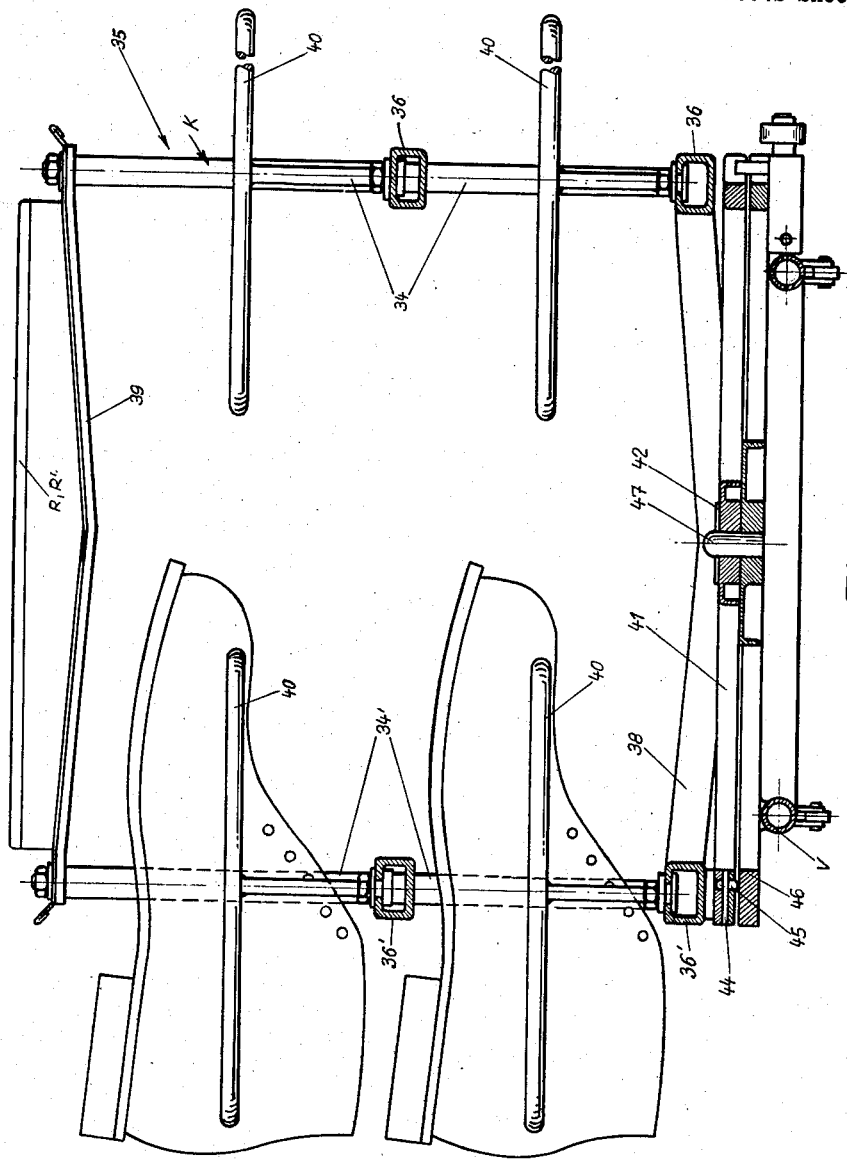
Figure 6:
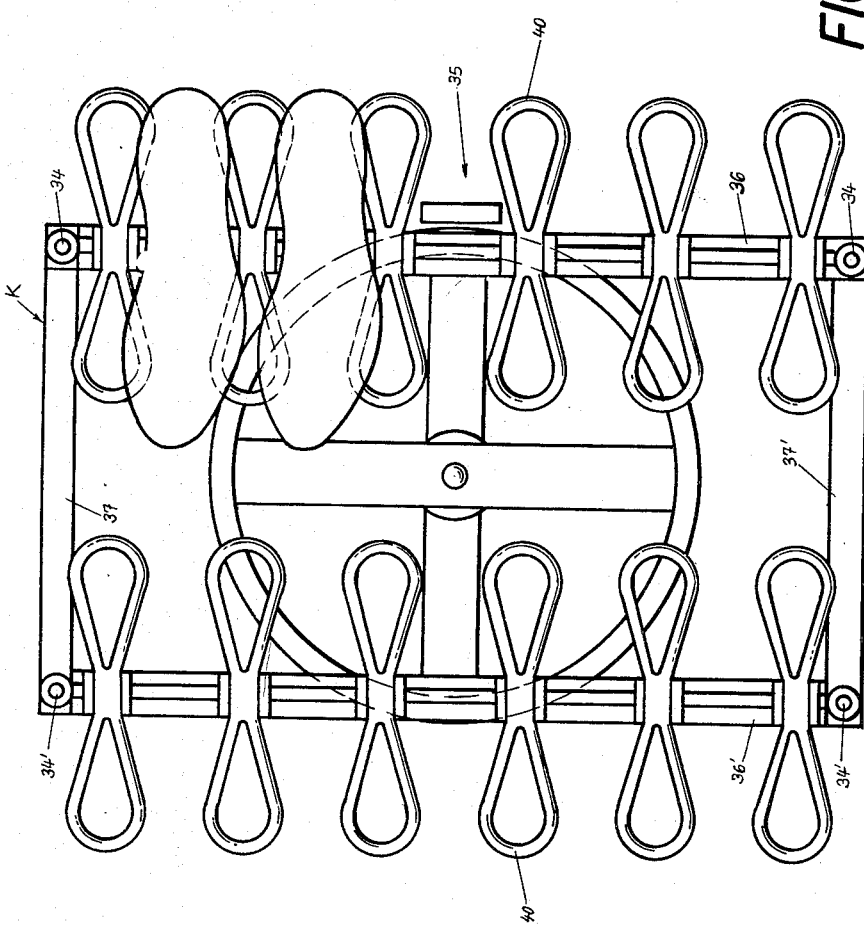
Figure 7:
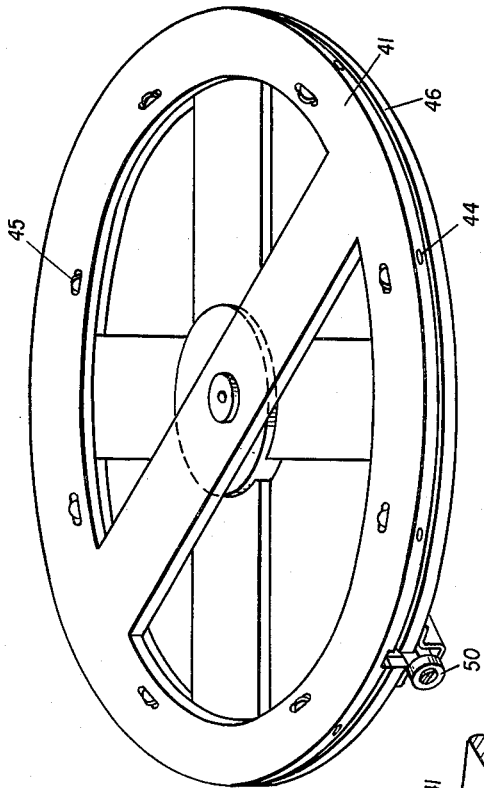
Figure 8:
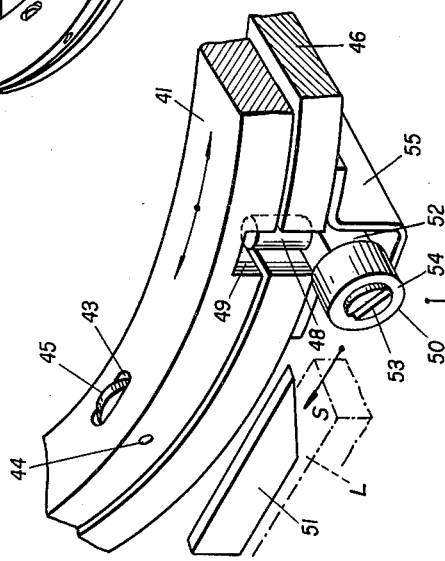

Further advantages of the device according to the present invention will be disclosed hereinafter with reference to the accompanying drawing illustrating, by way of example, an embodiment of the present invention, and wherein:

Figure 1 is a diagrammatic elevational view of endless conveyors arranged above each other in the manner hitherto known, Figure 2 is a diagrammatic plan view of the upper endless band in an arrangement embodying the present invention, Figure 3 is a diagrammatic plan view of the lower endless band in an arrangement embodying the present invention, Figure 4 is a digammatic transverse sectional view of the arrangement of the carriages on the superposed endless conveyors as shown in Figs. 2 and 3, Figure 5 is an elevational view of a carriage laden with shoes under treatment, with the bottom rotary portion being shown in section, Figure 6 is a diagrammatic top view of the carriage of Figure 5, Figure 7 is a perspective view of the rotary portion of the carriage, and Fig. 8 is a perspective view of an automatic pawl mechanism of the carriage, shown on an enlarged scale.

Referring to the drawing in detail, Fig. 1 illustrates the hitherto known arrangement wherein the finishing operations are performed on shoes on an endless upper conveyor 30, while a lower endless conveyor 31 carries the shoes under treatment through the drying plant. The starting point of the working operations is at point 1 on conveyor 30, and finishing operations are performed on the shoes carried by conveyor 30 up to point 3. As soon as the shoes under treatment arrive at point 3, the worker removes the five-pair carriage from the upper conveyor and manually transfers the carriage, in the direction of the arrow P, to the point 4 on the lower drying conveyor 31 whereon the shoes under treatment then pass through the drying space 6. After the shoes have passed through the drying space and arrive at the point 7, the worker, again in stooped down position, removes them from the lower conveyor and manually transfers the shoes, in the direction of the arrow R to the upper conveyor 30 at the point 8 whereupon the finishing operations are performed along the sector 9 and finishing sector 11, until the shoes in finished condition, arrive at the point 11.

Figs. 2 and 3 illustrate an arrangement according to the present invention for transporting the shoes under treatment on upper and lower endless conveyors 32, 33 having a joint drying space H arranged within their closed paths. The endless upper conveyor 32 passes a starting point 12 and finishing operations are performed during passage through the sector 13, the shoe upper being in course of this operation stretched on the last at the point 13'. At this point 13', each carriage of conveyor 32, hereinafter described in detail, is freed for rotation about a vertical axis, whereupon the worker, in an upright position, turns the carriage through an angle of 180° so that the shoes under treatment which up to that moment have been disposed at the outside of the conveyor 32 are then disposed at the inside of the conveyor 32. The shoes under treatment then move in continuous sequence through the drying space H inside the closed path of the conveyor and the shoes are dried through the effect of the air heated by the heating elements 60 (Fig. 4). On arrival at the point 15, each carriage is again automatically released for rotation and turned through an angle of 180° so that the dried shoes again are disposed at the outside of conveyor 32 at the point 16 and then proceed in continuous sequence through the connecting sector 17 to the point 18 and further on through the sector 19 where the shoes are finished, for removal from upper conveyor 32 at the point 20.

The lower endless conveyor 33 (Fig. 3) is likewise a working conveyor completely independent of the upper endless conveyor 32 and is serviced by the second working shift, which performs the same finishing process. The finishing operation starts at the point 21 and the shoes under treatment first pass through the sector 22 where the shoe upper is stretched on the last. At the point 22' the carriage is released automatically for rotation by a worker of the second shift who, while in an upright position, turns the carriage through 180° with a movement of his hand so that the shoes under treatment previously disposed at the outer side of the conveyor 33 are disposed, from the point 23 onwards at the inside of the conveyor 33. In continuous sequence the shoes under treatment are then moved through the drying space H in the same manner as on the conveyor 32 and are there dried out in the same manner. After arriving at the point 24 where the carriage is automatically released for rotation and turned by 180°, the shoes under treatment are disposed at the position 25 at the outer side of the conveyor 33, whereupon they are passing in continuous sequence through the connecting sector 26 up to the point 27 and in further continuous sequence through the sector 28 up to the finishing point 29.

The endless conveyors 32 and 33 (Fig. 4) have carriages 35, 35' for supporting the shoes under treatment. The carriages 35 and 35' have structural frames K, K' (Figs. 4, 5, 6). The structural frames K, K' are each built up from the columns 34, 34' connected by longitudinal girders 36, 36' and cross girders 37, 37' (Figs. 4, 5) and, in the case of each top frame K, by the platform 39.

On the longitudinal girders 36, 36' are mounted the carriers 40 (Fig. 5) for the shoes under treatment. The lower part of each of the frames K, K' is of circular shape and forms an upper turnplate 41. Each of the frames K and K' further has a lower turnplate 46 which is also of circular shape and underlies the related upper turnplate 41. The lower turnplate 46 has an upwardly projecting pin 47 at its center which is received in a suitable bearing 42 at the center of the upper turnplate 41 in order to locate the latter concentrically with respect to the related lower turnplate (Fig. 5).

Each of the upper turnplates 41 further has a series of circumferentially spaced apart slots 43 (Figs. 7 and 8) opening at the upper and lower surfaces thereof, and receiving rollers 45 which are rotatable on axles 44 (Figs. 5, 7 and 8) and which project below the lower surface of the upper turnplate 41 for rolling engagement with the upper surface of the related lower turnplate 46, as is clear in Fig. 5. Thus, the upper turnplate 41 and the frame K or K' of which it is a part are free to rotate relative to the related lower turnplate 46 about a vertical axis defined by the central pivot 47.

Each lower turnplate 46 is fixedly mounted on a frame or undercarriage V (Fig. 5) having rollers or wheels which are engageable with suitable tracks or the like (not shown) defining the path to be followed by the successive carriages of the related conveyor 32 or 33, and the undercarriages V of the several carriages making up each of the conveyors are coupled together in succession so as to move one after the other along the prescribed path.

The frame K or K' of each of the carriages is normally held against rotation with respect to the related lower turnplate 46 by an automatically releasable latch mechanism shown in Figs. 5, 7 and 8. This latch mechanism which is generally identified by the reference numeral 50 includes a latch pin 48 movable vertically within a recess or cutout formed in the lower turnplate 46 and engageable upwardly in one or the other of two downwardly opening keeper notches 49 formed in the upper turnplate 41 at diametrically opposed locations on the latter. The latch pin 48 is mounted on a lever 52 which extends radially with respect to the lower turnplate 46 and which is pivotally mounted, at its inner end, under the lower turnplate for rocking about a horizontal axis. The outer end of lever 52 projects radially beyond the outer periphery of lower turnplate 46 and receives a screw 53 which forms an axle for a roller 54.

The roller 54 is engageable with the underside of a suitably shaped cam 51 (Fig. 8) which is fixedly mounted on the supporting structure L of the conveyors 32 and 33 at the points 13' and 15 and at the points 22' and 24 along the paths of the conveyors 32 and 33, respectively. Thus, when each of the carriages moving in the direction of the arrow S on Fig. 8 reaches the location of a cam 51, the inclined lower surface of that cam is engaged by the follower 54 of the latch mechanism 50 of the carriage and depresses the roller 54, in the direction of the arrow T, in order to release the latch pin 48 from the keeper notch 49, thereby to release the frame K or K' for rotation, either manually or automatically, through an angle of 180°. If desired, as shown in Fig. 8, the lever 52 can be disposed within a protective housing or hood 55.

The above described device enables shoes of different types to be manufactured independently on two superposed endless conveyors serviced by different working shifts, the hitherto indispensable and tiresome operation of manually transferring the shoes under treatment from the upper endless conveyor onto the lower conveyor for drying out and, thereafter, from the lower back to the upper conveyor is dispensed with.

We claim:

1. A device for transporting shoes during the manufacture thereof, comprising two superposed endless conveyors operating independently of each other and moving along closed paths each having an initial sector where shoe uppers are mounted on lasts, a subsequent sector spaced along the path from said initial sector and where soles are fixed to the uppers and a final working sector where finishing operations are performed on the shoes, means within the closed paths of said conveyors for drying the shoes on both conveyors, each of said conveyors including a series of carriages each adapted to support a plurality of pairs of shoes and being rotatable about a vertical axis so as to selectively dispose the shoes in positions at the outside and inside, respectively, of the related path, latch means for holding each carriage against rotation in a selected one of said positions, and latch releasing means located at the end of said initial sector and at the beginning of said subsequent sector operative to release said latch mechanism of each carriage so that, after moving along said initial sector where shoe uppers are mounted on lasts at the outside of the conveyor path, the carriage is free to be turned through 180 degrees to dispose the uppers on lasts to the action of said drying means at the inside of the path, and, upon arrival at the beginning of said subsequent sector, the carriage is again free to be turned through 180 degrees to dispose the dried uppers at the outside of the conveyor path for the fixing of soles thereto and for the finishing operations.

2. A device as in claim 1; wherein each of said carriages includes a frame structure with shoe carriers thereon and with a circular bottom portion having a bearing at its center, and a lower circular turnplate underlying said bottom portion and having a central pin received in said bearing to define the axis of rotation.

3. A device as in claim 2; wherein said bottom portion of the frame structure has rollers projecting below its lower surface and in rolling contact with said lower turnplate to support said frame structure on the latter.

4. A device as in claim 3; wherein said latch mechanism includes a latch lever pivotally mounted on said lower turnplate and having a latch pin projecting upwardly therefrom, said circular bottom portion having two downwardly opening keeper notches at diametrically opposed locations and adapted to selectively receive said latch pin for securing said frame structure against rotation relative to said lower turnplate.

5. A device as in claim 4; wherein said latch mechanism further includes a follower roller on said lever; and wherein said latch releasing means at each location consists of a fixed cam member engageable by said follower roller to depress said lever and thereby remove said latch pin from a keeper notch.

References Cited in the file of this patent

UNITED STATES PATENTS 1,204,135 Cook Nov. 7, 1916